US012515911B2

(12) United States Patent
Vavricka

(10) Patent No.: US 12,515,911 B2
(45) Date of Patent: Jan. 6, 2026

(54) SYSTEM FOR USING A DIGGER VEHICLE TO REEL WIRE

(71) Applicant: VAVRICKA DEVELOPMENT TRUST, Williamston, MI (US)

(72) Inventor: Chad Raymond Vavricka, Morrice, MI (US)

(73) Assignee: VAVRICKA DEVELOPMENT TRUST, Williamston, MI (US)

( * ) Notice: Subject to any disclaimer, the term of this patent is extended or adjusted under 35 U.S.C. 154(b) by 515 days.

(21) Appl. No.: 17/938,049

(22) Filed: Oct. 5, 2022

(65) Prior Publication Data

US 2024/0116735 A1 Apr. 11, 2024

(51) Int. Cl.
*B65H 75/42* (2006.01)
*B65H 75/44* (2006.01)
*H02G 1/06* (2006.01)

(52) U.S. Cl.
CPC ....... *B65H 75/425* (2013.01); *B65H 75/4481* (2013.01); *H02G 1/06* (2013.01); *B65H 75/4402* (2013.01)

(58) Field of Classification Search
CPC ...... B65H 75/02; B65H 75/18; B65H 75/425; B65H 75/4481; B65H 75/4402; B65H 75/403; H02G 1/06
USPC ............................................... 242/557, 599.4
See application file for complete search history.

(56) References Cited

U.S. PATENT DOCUMENTS

| | | | | | |
|---|---|---|---|---|---|
| 2,749,091 | A * | 6/1956 | Wall | E21B 19/162 | 242/615 |
| 2,793,820 | A * | 5/1957 | Torgeson | B65H 54/44 | 242/406 |
| 3,173,272 | A * | 3/1965 | Knapp | E02F 5/102 | 193/35 R |
| 3,343,739 | A * | 9/1967 | Kinnan | B60P 3/00 | 405/177 |
| 3,863,859 | A * | 2/1975 | Keith | B65H 49/32 | 242/399.2 |
| 5,636,648 | A * | 6/1997 | O'Brien | E03F 7/10 | 134/107 |
| 6,152,425 | A | 11/2000 | Boyer | | |
| 6,830,235 | B2 | 12/2004 | Stafford | | |
| 7,530,520 | B2 * | 5/2009 | Jones | B65H 54/74 | 242/403 |
| 8,784,007 | B2 * | 7/2014 | Wilson | B09B 1/004 | 405/129.95 |
| 10,008,838 | B1 | 6/2018 | Rhodes | | |
| 10,431,965 | B2 | 10/2019 | Palmer | | |
| 10,464,790 | B1 | 11/2019 | Brutaru | | |

(Continued)

FOREIGN PATENT DOCUMENTS

| | | |
|---|---|---|
| CN | 203529789 U | 4/2014 |
| JP | H11141262 A | 5/1999 |
| WO | WO 2011/148206 | * 12/2011 |

*Primary Examiner* — William A. Rivera
(74) *Attorney, Agent, or Firm* — DANE IP Law PC

(57) ABSTRACT

An apparatus and method for converting the digging mechanism of a digger vehicle into a spooling mechanism is disclosed. An attachment assembly may be attached to a spool and to an auger drive shaft of the digger vehicle to create the spooling mechanism. The spooling mechanism may function by the auger drive shaft providing rotational force that gets translated to the spool through the attachment assembly to rotate and wind or unwind wire.

5 Claims, 7 Drawing Sheets

(56) References Cited

U.S. PATENT DOCUMENTS

| | | | | |
|---|---|---|---|---|
| 11,505,424 | B2 * | 11/2022 | Snyder .................. | B65H 54/54 |
| 2019/0168987 | A1 * | 6/2019 | Fjetland ................ | B65H 75/42 |

* cited by examiner

SYSTEM FOR USING A DIGGER VEHICLE TO REEL WIRE

CROSS-REFERENCE TO RELATED APPLICATIONS

Not Applicable

STATEMENT RE: FEDERALLY SPONSORED RESEARCH/DEVELOPMENT

Not Applicable

BACKGROUND

The various embodiments and aspects described herein relate to a system for using a digger vehicle to reel wirelines by converting an auger digging mechanism of the digger vehicle into a mechanism for winding and unwinding wires.

Currently, the collection and distribution of wirelines that span over long distances, such as electric powerlines, require specialized vehicles to be present at the job site to wind or unwind the wirelines onto a spool. Acquiring such specialized spooling vehicles may be difficult and expensive. The usage of digger vehicles is prevalent in the wire installation industry, and such vehicles are normally present at the job sites that require the collection or distribution of wirelines. Digger vehicles are not designed for spooling wirelines, especially wirelines that may span for long distances. However, digger vehicles may have the necessary actuating mechanism to wind and unwind wire onto a spool.

Accordingly, there is a need in the art for an improved device, system, and method for using a digger vehicle to spool wire.

BRIEF SUMMARY

The various embodiments and aspects disclosed herein address the needs discussed above, discussed below and those that are known in the art.

An apparatus and method for converting the digging mechanism of a digger vehicle into a spooling mechanism is disclosed. An attachment assembly may be attached to a spool and to an auger drive shaft of the digger vehicle to create the spooling mechanism. The spooling mechanism may function by the auger drive shaft providing rotational force that gets translated to the spool through the attachment assembly to rotate and wind or unwind wire. The attachment assembly may have a first coupling mechanism to attach to the auger drive shaft and a second coupling mechanism to attach to the spool. A third coupling mechanism may be used with the attachment assembly to maintain a desired orientation of the spooling mechanism relative to the ground when spooling the wireline. The spooling mechanism may be used to wind and unwind different types of wires, such as powerline, telephone, cable, or fiber optic wires.

More particularly, an attachment assembly for converting an auger digging mechanism of a digger vehicle into a spooling mechanism for winding or unwinding wire is disclosed. The assembly may comprise a plate body, first and second studs, a hollow cylinder, a sleeve and a pin. The plate body may define a first surface and a second surface opposite to the first surface. The plate body may have a through hole. The first and second studs may extend outward from the second surface and may engage the coupling holes of the spool A hollow cylinder may be attached to the plate body. The hollow cylinder may protrude outwards from the first surface. The hollow cylinder may have a through hole which is aligned to a through hole of the plate body. The through hole of the hollow cylinder may be configured to receive a drive shaft of a motorized auger drive of the digger vehicle. The hollow cylinder may have a transverse hole to engage the auger digging mechanism to the attachment assembly. A sleeve may be rotatably disposed around the hollow cylinder and may have a tying ring configured for tying a supporting mechanism for the spooling mechanism. A pin may be disposable through the transverse hole and a pin hole of the auger digging mechanism to engage the auger digging mechanism to the attachment assembly.

In some embodiments of the attachment assembly, wire may be fed to the spooling mechanism via a wire guiding mechanism.

In some embodiments of the attachment assembly, the sleeve may be rotatable around the hollow cylinder.

In some embodiments of the attachment assembly, the sleeve may have a grease fitting hole configured as a lubrication input between an inner surface of the sleeve and an outer surface of the hollow cylinder.

In some embodiments of the attachment assembly, the wire guiding mechanism may be attached to a winch mechanism of the digger vehicle.

In some embodiments of the attachment assembly, the second surface may have a first channel groove along a first opening configured for the first stud to slide and be adjusted, and a second channel groove along a second opening configured for the second stud to slide and be adjusted.

In some embodiments of the attachment assembly, the first stud may have a first adjusting side penetrating through the first opening and outwards towards the first surface of the plate body, and the second stud may have a second adjusting side penetrating through the second opening and outwards towards the first surface of the plate body.

In some embodiments of the attachment assembly, the first and second adjusting sides may be bolt shaped and threaded and configured to be fastened by fastening elements.

Additionally, a system for converting an auger digging mechanism of a digger vehicle into a spooling mechanism for winding or unwinding wire is disclosed. The system may comprise a wiring spool, a motorized auger drive of the digger vehicle, and an attachment assembly. The wiring spool may have a cylindrical body between a first and a second flange disks, the first flange disk may have a plurality of coupling holes surrounding a center arbor hole. The motorized auger drive of the digger vehicle may have a drive shaft configured to rotate about an axis parallel to a length of the drive shaft and in a center of a cross-sectional area of the drive shaft. The attachment assembly may have a plate body with a first surface and a second surface opposite to the first surface, the plate body may have a through hole. The attachment assembly may have first and second studs extending outward from the second surface and engageable to the plurality of coupling holes of the wiring spool. The attachment assembly may have a hollow cylinder attached to the plate body, the hollow cylinder protruding outwards from the first surface, wherein the hollow cylinder has a through hole which is aligned to a through hole of the plate body, the through hole of the hollow cylinder configured to receive the drive shaft of the motorized auger drive of the digger vehicle, the hollow cylinder having a transverse hole to engage the drive shaft to the attachment assembly. The attachment assembly may have a sleeve rotatably disposed around the hollow cylinder and having a tying ring configured for tying a supporting mechanism for the spooling mechanism. A pin may be disposable through the transverse hole and a pin hole of the drive shaft to engage the drive shaft to the attachment assembly.

In some embodiments of the system, wire may be fed to the spooling mechanism via a wire guiding mechanism.

In some embodiments of the system, the sleeve may be rotatable around the hollow cylinder.

In some embodiments of the system, the sleeve may have a grease fitting hole configured as a lubrication input between an inner surface of the sleeve and an outer surface of the hollow cylinder.

In some embodiments of the system, the second surface may have a first channel groove along a first opening configured to receive the first stud, and a second channel groove along a second opening configured to receive the second stud.

In some embodiments of the system, the first stud may have a first adjusting side protruding through the first opening and outwards from the first surface of the plate body, and the second stud may have a second adjusting side protruding through the second opening and outwards from the first surface of the plate body.

In some embodiments of the system, the first and second adjusting sides may be bolt shaped and threaded and configured to be fastened by fastening elements.

Furthermore, a method for converting and using an auger digging mechanism of a digger vehicle into a spooling mechanism to wind or unwind wire is disclosed. The method may comprise coupling an attachment assembly to a wire spool using a first and a second stud that extend outwards from a first surface of the attachment assembly to a first and a second coupling holes of a first flange disk of the wire spool. The method may further comprise inserting a drive shaft of the auger digging mechanism through a center hole of the wire spool from a second flange disk through a body of the wire spool and out of the first flange disk, the drive shaft also being inserted inside a hollow cylinder protruding outwards from a second surface of the attachment assembly. The method may further comprise securing the drive shaft to the attachment assembly by aligning a transverse hole of the hollow cylinder with a pin hole of the drive shaft and inserting a pin through the pin hole and the transverse hole. The method may further comprise tying a supporting mechanism to a sleeve rotatably disposed around the hollow cylinder to maintain a desired orientation of the wire spool. The method may further comprise operating the auger digging mechanism to provide a rotational force to the drive shaft that rotates the attachment assembly and the wire spool to provide a reeling force to wind or unwind wire onto the body of the wire spool.

In some embodiments of the method, there may be guiding wire onto the body of the wire spool using a wire guiding mechanism that is attached to a winch line of the digger vehicle.

In some embodiments of the method, there may be moving the winch line upwards and downwards for the wire guiding mechanism to guide wire evenly onto the body of the wire spool.

In some embodiments of the method, there may be adjusting the first and the second studs along a length of the attachment assembly prior to being coupled to the first and the second coupling holes.

In some embodiments of the method, there may be activating a plurality of stabilizers of the digger vehicle prior to operating the auger digging mechanism to provide the rotational force.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1A:
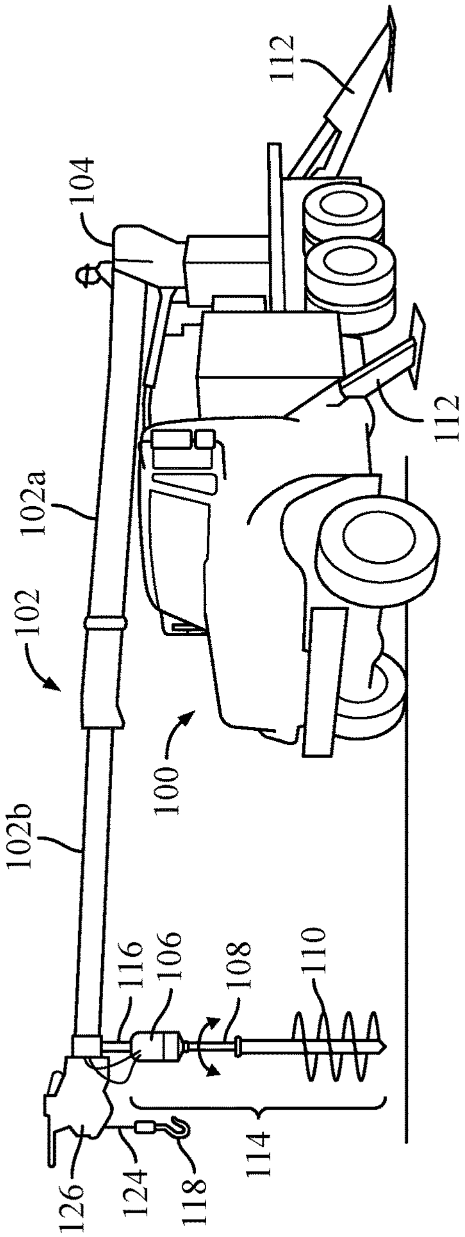
FIG. 1A shows the general components of a digger truck.
Figure 1B:
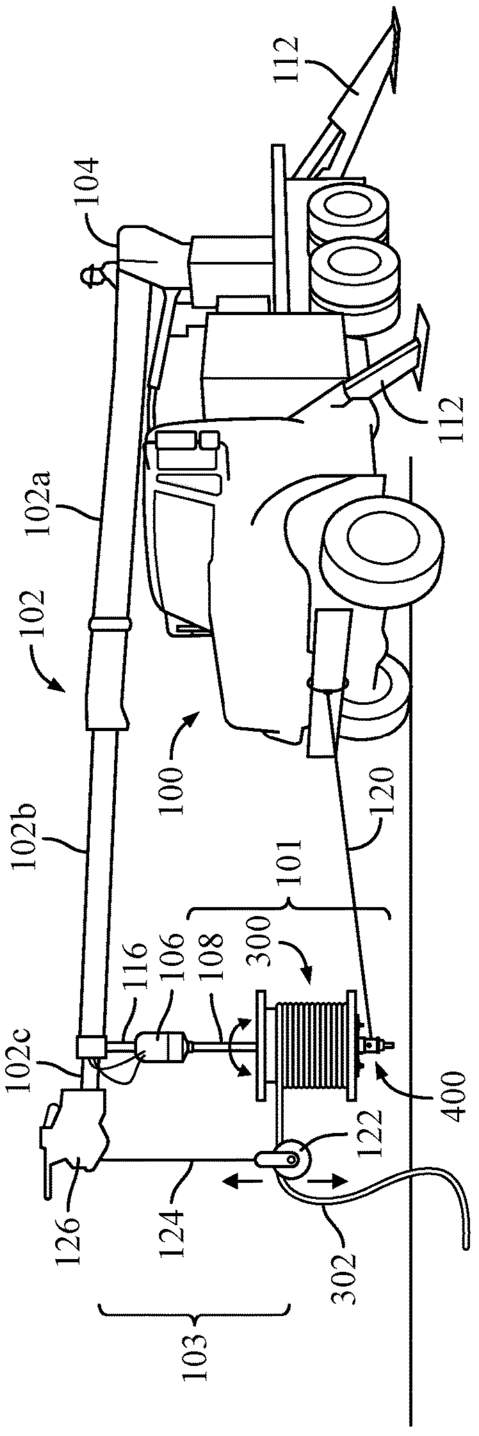
FIG. 1B shows the digging mechanism of the digger truck being converted into a spooling mechanism to wind or unwind wire.
Figure 2:
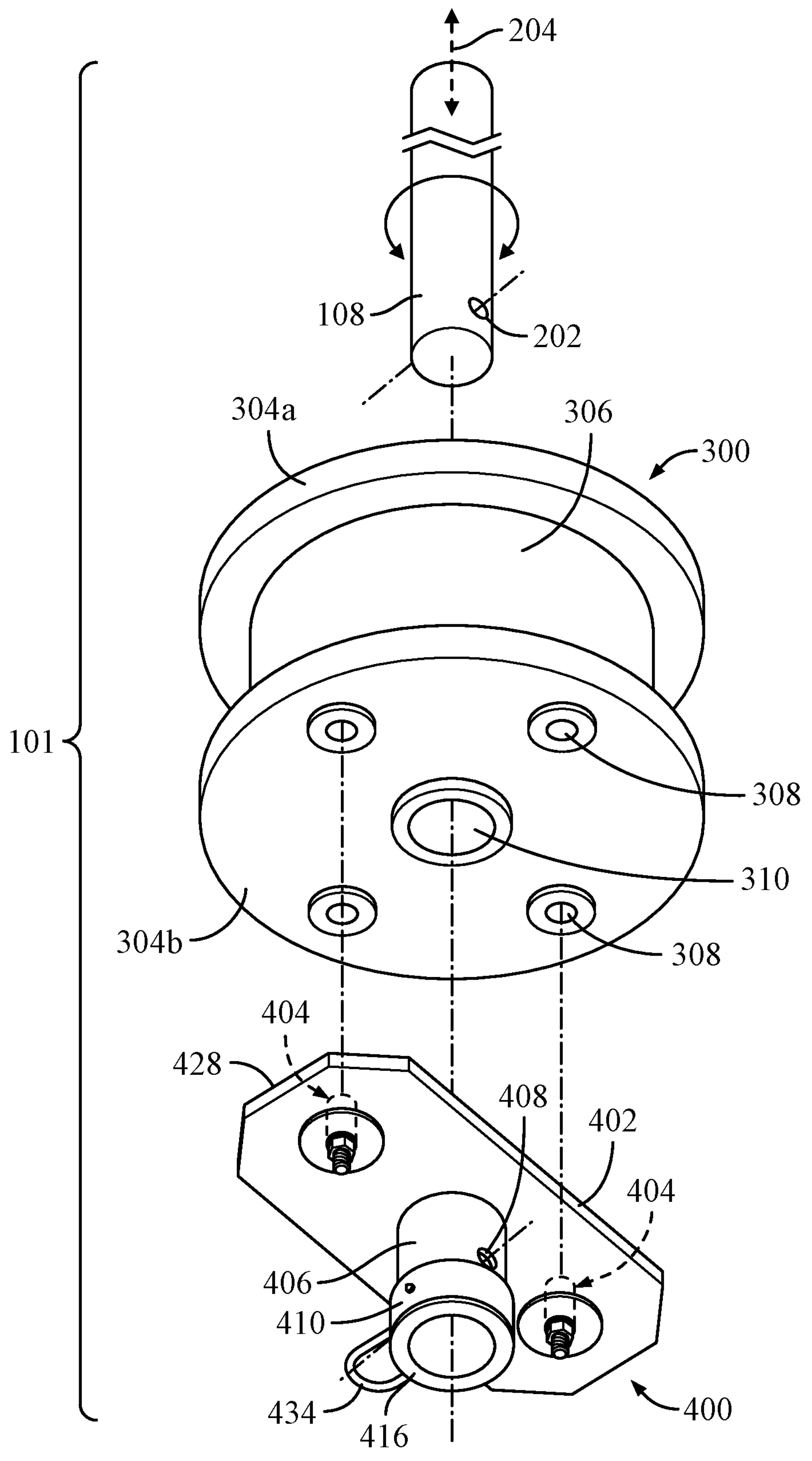
FIG. 2 shows how the components needed to create the spooling mechanism may be attached to each other.
Figure 3:
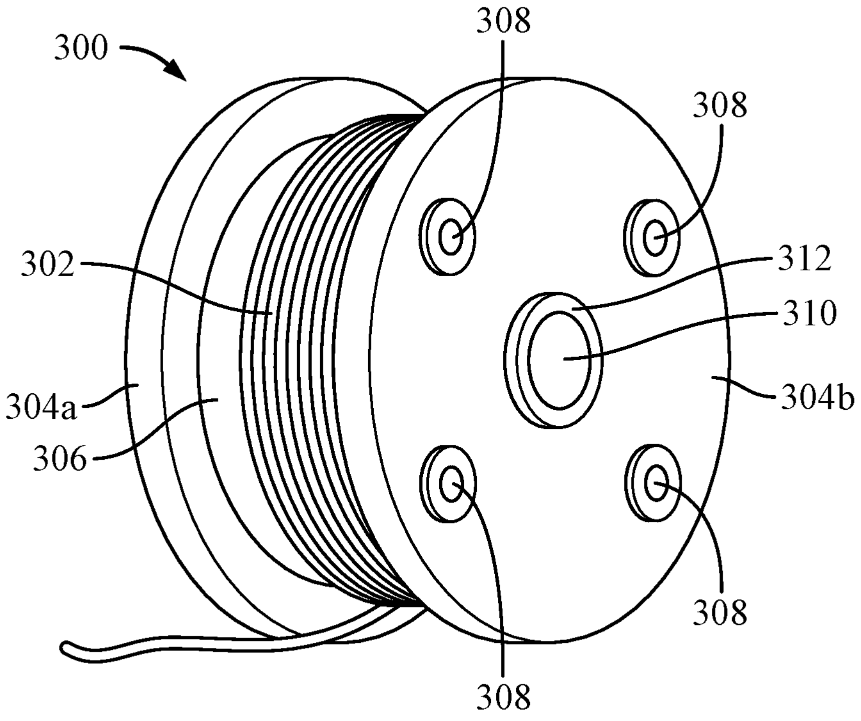
FIG. 3 shows the different components of a wire spool.

Referring now to the drawings, an apparatus and method for converting the digging mechanism 114 of a digger vehicle 100 into a spooling mechanism 101 is disclosed and shown in FIGS. 1A-B. The auger 110 of the digger vehicle 100 may be detached so that the drive shaft 108 of the auger drive 106 may penetrate through the body of a spool 300 and be attached to an attachment assembly 400 on the other end. The attachment assembly 400 may also be coupled to the spool 300. As a result, the rotational motion of the drive shaft 108 is translated to the spool 300, which creates a reeling force to wind and unwind wire 302. The orientation of the spooling mechanism 101 may be substantially perpendicular to the ground. As shown in FIG. 2, the attachment assembly 400 may have studs 404 that couple with the side holes 308 of the spool 300, and the attachment assembly 400 may have a hollow cylinder 406 for the drive shaft 108 of the auger drive 106 to be inserted inside and interlock with the assembly. FIG. 3 shows the general components of a spool 300, and FIGS. 4-6 show the different components of the attachment assembly 400 in different views. Although a digger truck is being used to describe the elements of the invention, the components and methods of this invention may also apply to other digger vehicles.

Referring now specifically to FIG. 1A, the general components of a digger truck 100 is shown. By way of example and not limitation, the digger truck 100 may be a digger derrick truck. The digger truck 100 may have a boom arm mechanism 102 for changing the horizontal and vertical position of the digging mechanism 114. The boom arm mechanism 102 may have a lower and intermediate boom arms 102*a, b*, where the intermediate boom arm 102*b* may extend away and retract inside the lower boom arm 102*a*. The boom arm mechanism 102 may also rotate around the digger truck 100 and change elevation relative to the ground. The boom arm mechanism 102 may also have an upper boom arm 102*c*, as shown in FIG. 1B. The upper boom arm 102*c* may extend away and retract inside the intermediate boom arm 102*b*.

The digger truck 100 may have a winch mechanism 126 configured to translate a winch line 124 (shown in FIG. 1B) downwards and upwards relative to the boom arm mechanism 102. As described elsewhere herein, the end of the winch line 124 may have a hook 118 that may be transformed into a wire roller 122, as shown in FIG. 1B. The winch mechanism 126 may be located on the outer end of the upper boom arm 102*c*. Alternatively, the winch mechanism 126 may be located on the outer end of the intermediate boom arm 102*b* and farther away from the motorized auger drive 106.

There may exist a control section 104 in the back of the digger truck 100 where a user may control many of the mechanisms of the truck, specifically the boom arm mechanism 102, the winch mechanism 126, and the different components of the digging mechanism 114. A user may operate the control section 104 to extend and retract the boom arms 102*a-c*, move the arms around the digger truck 100, and raise or lower the boom arm mechanism 102. The control section 104 may also be used to lower and raise the winch line 124 of the winch mechanism 126 to a desired elevation. Alternatively, the winch mechanism 126 may be actuated from a different control location on the digger truck 100. Additionally, the control section 104 may control the operation of the digging mechanism 114 by controlling the actuation of the drive shaft 108 of the auger drive 106, which provides rotational motion to the auger 110. The control section 104 may also be used to change the position and orientation of the digging mechanism 114 and the winch mechanism 126 by moving the boom arms 102*a-c*. As shown in FIG. 1B, the digging mechanism 114 may be converted into a spooling mechanism 101, and so the control section 104 may control the operation, position, and orientation of the spooling mechanism 101, as described further elsewhere herein. The winch mechanism 126 may also be converted to a wire guiding mechanism 103 (shown in FIG. 1B) to be used in conjunction with the spooling mechanism 101 and controlled by the control section 104.

The digging mechanism 114 may have a motorized auger drive 106 having a rotating drive shaft 108 where a detachable auger 110, or the attachment assembly 400 of this invention (shown in FIG. 1B), may be connected. The drive shaft 108 may be a long rod that may be inserted inside the hollow center of the detachable auger 110 or all the way through the center hole of a spool 300, as shown in FIG. 1B. By way of example and not limitation, the drive shaft 108 may be between four to seven feet long. The auger drive 106 may be mounted at an attachment point 116 that may be located on the end of the intermediate boom arm 102*b* that is away from the lower boom arm 102*a*. The attachment point 116 of the auger drive 106 may also be located elsewhere on the boom arm mechanism 102. By way of example and not limitation, the auger drive 106 may swivel about the attachment point 116 to change orientation and angular position. As shown in FIG. 1B, such change in orientation may need to be controlled by a supporting mechanism 120 when using the auger drive 106 to wind or unwind wire 302 on a spool 300.

Referring now to FIG. 1B, the digging mechanism 114 of the digger truck 100 being converted into a spooling mechanism 101 is shown. The digging mechanism 114 may be converted to the spooling mechanism 101 by the drive shaft 108 being inserted through the center hole of a spool 300, where the outer end of the drive shaft 108 projecting out of the other side of the spool 300 is secured to an attachment assembly 400, which the attachment assembly is in turn secured to the spool 300. After such components are attached to each other, the spooling mechanism 101 may then hang in a substantially vertical position for the rotational force of the drive shaft 108 to be translated to the spool 300, via the attachment assembly 400, to rotate and wind or unwind the wireline 302. The winch mechanism 126 may also be transformed into a wire guiding mechanism 103 to direct the wireline 302 on the correct portion of the spool 300.

The attachment assembly 400 used to create the spooling mechanism 101 may have a first coupling mechanism to securely attach to the drive shaft 108 and rotate with the rotational force generated by the auger drive unit 106. The attachment assembly 400 may have a second coupling mechanism to securely attach to the spool 300 and translate the rotational force of the drive shaft 108 to the spool 300. A third coupling mechanism may be used with the attachment assembly 400 to maintain a desired orientation relative to the ground when spooling the wireline 302. As a result, the spool 300 may rotate to wind and unwind wirelines 302, where the wire guiding mechanism 103 may help to evenly wind the wireline 302 onto the spool. The spool 300 may generally be cylindrical and have interfaces at the ends of the cylinder to connect with the attachment assembly 400 and also allow the drive shaft 108 to project through the body of the spool 300. The spool 300 may be designed to carry different types of wires, such as powerline, telephone, cable, or fiber optic wires.

When the drive shaft 108, attachment assembly 400, and the spool 300 are attached together, then the spooling mechanism 101 may be orientated and secured in a desired position to efficiently spool the wirelines 302. The desired position of the spooling mechanism 101 may be one that is substantially vertical and perpendicular to the ground, as shown in FIG. 1B. As explained elsewhere herein, the auger drive 106 having the shaft 108 may change angular position and swivel relative to the attachment point 116. As a result, the spooling mechanism 101 may also change its angular position in the same way since the drive shaft 108 of the auger drive 106 make up part of the spooling mechanism 101. Such swiveling and changing of angular position may be unwanted in operating the spooling mechanism 101 and may likely occur since reeling the wireline 302 may create a tensile force pulling the spooling mechanism 101 away from the desired position. Consequently, a counteracting force may be needed to keep the spooling mechanism 101 substantially stationary in the desired position, which the desired position may be substantially vertical and perpendicular to the ground. This counteracting force does not necessarily need to keep the spooling mechanism 101 in a fixed position and may allow such mechanism to change angular position to some degree. The counteracting force may be created by a supporting mechanism 120 tied or secured on one end to the attachment assembly 400 and on the other end to the digger truck 100, or another object, that creates a desired tensile force to counter the unwanted tensile force created by winding the wireline 302. The component of the digger truck 100 that may be used to tighten or secure a strap and form the supporting mechanism 120 may be one that is on the same level as the attachment assembly 400 to create a horizontal tensile force. By way of example and not limitation, such component may be the bumper of the digger truck 100 or a hook on the bumper. Since the weight of the spooling mechanism 101 may help counter any unwanted vertical tensile force, the creation of the horizontal tensile force created by the supporting mechanism 120 may be sufficient to keep the spooling mechanism 101 stable and substantially stationary.

The boom arm mechanism 102 may move the spooling mechanism 101 at different positions around the digger truck 100 using the control section 104. The boom arms 102*a, b* may change the elevation level of the spooling mechanism 101. Preferably, the spooling mechanism 101 should be close to the ground when in operation. By way of example and not limitation, the spooling mechanism 101 may be elevated between one to six feet off the ground. The boom arms 102*a, b* may also be in an extended position or a retracted position when the spooling mechanism 101 is in operation.

The winch mechanism 126 of the digger tuck 100 may be transformed into a wire guiding mechanism 103 to be used in conjunction with the spooling mechanism 101 and direct the wireline 302 onto the spool 300. This may be necessary so that the wireline 302 does not merely fill one portion of the cylindrical body 306 (shown in FIG. 2) when winding the wireline 302. By way of example and not limitation, a wire roller 122 may be attached to the hook 118 (shown in FIG. 1A) at the end of the winch line 124, where the wireline 302 may then be fed through the wire roller 122 and be reeled onto the spool 300. Alternatively, the hook 118 may be detached from the winchline 124 and a wire roller 122 may be attached in place of it, or the hook 118 itself may act as the wire roller 122. When the wireline 302 is coupled with the wire roller 122, then the winch line 124 may be actuated upwards and downwards while the spool 300 of the spooling mechanism 101 is rotating in order for the wireline 302 to be reeled evenly onto the body of the spool 300. The upward and downward translational motion of the wire guiding mechanism 103 may be synchronized with the rotational motion of the spooling mechanism 101 so that the wireline is evenly distributed onto the spool 300. By way of example and not limitation, the rotational speed of the spooling mechanism 101 may be similar or equal to the translational speed of the wire guiding mechanism 103 to accomplish such synchronization. By way of example and not limitation, such synchronization may be accomplished by an operator using the control section 104. By way of example and not limitation, the portion of the wireline 302 being fed to the wire roller 122 may be on a lower elevation than the spool 300 so that the wire guiding mechanism 103 can cover the spool with the wireline from bottom to top. Alternatively, another user may guide the wireline 302 onto the spool 300.

The digger truck 100 may also have a plurality of stabilizers 112 on the sides of the truck that extend downwards and contact the ground. The stabilizers 112 may provide a stabilized foundation that prevent the truck from wobbling during the operation of the spooling mechanism 101. When all of the wireline 302 is wound up on the spool 300 using the spooling mechanism 101, then the spool 300 may be placed in another vehicle, such as a flatbed truck, to transfer the filled-up spool 300 to another location, such as a storage location. This process may be more efficient and cost-saving since a specialized machine or vehicle designed for spooling wires would not be required.

Referring now to FIG. 2, a diagram of the different components of the spooling mechanism 101 and how they would be connected to each other is shown. The drive shaft 108 may provide a rotational force to the spooling mechanism 101 and may have an axis of rotation 204 in the center of the cross-sectional area of the drive shaft 108 and parallel to its length. The drive shaft 108 may rotate clockwise or counterclockwise depending on whether the user wants the spool 300 to wind or unwind wire. The drive shaft 108 may be sufficiently long enough to penetrate through the center hole 310 and the length of the spool 300 and also project into the hollow cylinder 406 of the attachment assembly 400, as explained elsewhere herein.

To assemble the spooling mechanism 101, the drive shaft 108 may be inserted in the center hole 310 of the spool 300 from a first circular plate 304*a* of the spool 300. The drive shaft 108 may then penetrate through the length of the spool 300 so that the outer end of the drive shaft 108 protrudes out of a second circular plate 304*b* of the spool 300 connected to the first circular plate 304*a* by the center hole 310. The cross-sectional diameter of the drive shaft 108 may be small enough to fit inside the center hole 310 of the spool 300.

After penetrating through the length of the spool 300 and protruding out of the second circular plate 304*b*, the drive shaft 108 may be inserted in a hollow cylinder 406 of the attachment assembly 400 from a contacting plate surface 428 of the assembly that contacts the second circular plate 304*b* of the spool 300 and aligns with the center hole 310. By way of example and not limitation, the drive shaft 108 may extend through the length of the hollow cylinder 406. The hollow cylinder 406 may be integrated with a first plate surface 412 of the body plate 402 of the assembly 400 and have an inner diameter that allows the drive shaft 108 to fit inside. The drive shaft 108 may have a first pinhole 202 that may be aligned with a second pinhole 408 of the hollow cylinder 406 for a locking pin to be inserted inside and lock the drive shaft 108 with the attachment assembly 400. By way of example and not limitation, the first pinhole 202 may penetrate through the body of the drive shaft 108, and the second pinhole 408 may have an opposing pinhole on the other side of the hollow cylinder 406. As a result, a locking pin may be inserted in the pinholes and penetrate the hollow cylinder 406 and the drive shaft 108 and be locked on each side of the cylinder 406.

The attachment assembly 400 may have a binding mechanism in the form of a plurality of studs 404 that may be aligned and inserted in the side holes 308 of the second circular plate 304*b* to couple the attachment assembly 400 with the spool 300. In this way, the rotational motion of the drive shaft 108 may be translated to the spool 300 through the attachment assembly 400 using the studs 404. This is because the drive shaft 108 is interlocked with the attachment assembly 400 and the attachment assembly 400 is interlocked with the spool 300 via the studs 404. The plurality of studs 404 may be adjustable so that they can align with the side holes 308. By way of example and not limitation, the ends of the adjustable studs 404 that are inserted inside the side holes 308 of the spool 300 may have locking mechanisms to interlock with the side holes 308 and prevent unwanted detachment between the components.

Additionally, the attachment assembly 400 may have a circular sleeve 410 around the hollow cylinder 406 for a strap, rope, or a chain to loop inside and tie to a tying ring 434 of the sleeve 410. The other end of the strap, rope, or chain may be tightened to a component of the digger truck 100, as shown in FIG. 1B. As a result, the tightening may create a supporting mechanism 120 (show in FIG. 1B) with a tensile force to hold the spooling mechanism 101 in the desired angular position about the attachment point 116. Such tensile force may be necessary since the spooling mechanism 101 may change angular position without the supporting mechanism 120. If the spooling mechanism 101 is free to swivel about the attachment point 116 (shown in FIG. 1B), then a tensile force created on the spool 300 by the weight of the wireline 302 that is being reeled may change the angular position of the spooling mechanism 101. A counteracting force may be needed to keep the spooling mechanism 101 substantially stationary in the desired position, which the desired position may be vertical and perpendicular to the ground. This counteracting force may be created by a supporting mechanism 120 tied or secured on one end to the circular sleeve 410 of the attachment assembly 400 and on the other end to the digger truck 100, or another body, that creates a desired tensile force to counter the unwanted tensile force created by winding the wireline 302. The component of the digger truck 100 that may be used to tighten a strap and form the supporting mechanism 120 may be one that is on the same level as the circular sleeve 410 to create a horizontal tensile force. By way of example and not limitation, such component may be the bumper of the digger truck or a hook on the bumper. Since the weight of the spooling mechanism 101 may help counter any unwanted vertical tensile force, the creation of the horizontal tensile force created by the supporting mechanism 120 may be sufficient to keep the spooling mechanism 101 stable and substantially stationary. The strap, rope, or chain used in the supporting mechanism 120 may preferably be non-clastic. It is also contemplated that the supporting mechanism 120 may be created by tightening one end of a strap, rope, or a chain to the circular sleeve 410 and the other end to an object not part of the digger truck 100 or to the digger truck 100. The supporting mechanism may be aligned about 170 to 190 degrees opposite from the line being reeled onto the spool to generate a stabilizing force to the force generated by the line being reeled on the spool.

Referring now to FIG. 3, the different components of a wire spool 300 is shown. The wire spool generally has a cylindrical body 306 (shown in FIG. 2) with two circular plates 304*a, b* attached to the ends of the cylindrical body 306. Wire 302 may be wrapped around the cylindrical body 306 and the circular plates 304*a, b* may be considered as flange disks 304*a, b*. Each flange disk 304*a, b* may have a center hole 310 and a plurality of side holes 308. The center hole 310 may be considered an arbor hole 310 and have reinforced material 312 surrounding the hole on the flange disk 304*a, b*. The side holes 308 may be considered as coupling holes 308 that align with the studs 404 of the attachment assembly 400, as shown in FIG. 2. By way of example and not limitation, there may exist between two to eight side holes 308 on each flange disk 304*a, b*. The side holes 308 may be symmetrically spaced around the center arbor hole 310, where pairs of side holes 308 are opposite to each other across the center hole 310 to align and couple with the studs 404 of the attachment assembly 400.

The spool 300 may be designed to carry different types of wires 302, such as powerline, telephone, cable, or fiber optic wires. The spool 300 may also hold several hundred yards to several miles of wire 302 on its cylindrical body 306. By way of example and not limitation, the spool may hold between 100 to 1,759 yards of wire, or between one to three miles of wire. As a result, the spooling mechanism 101 (shown in FIG. 1B) may be configured to also wind and unwind the aforementioned type and lengths of wires.

Figure 4A:
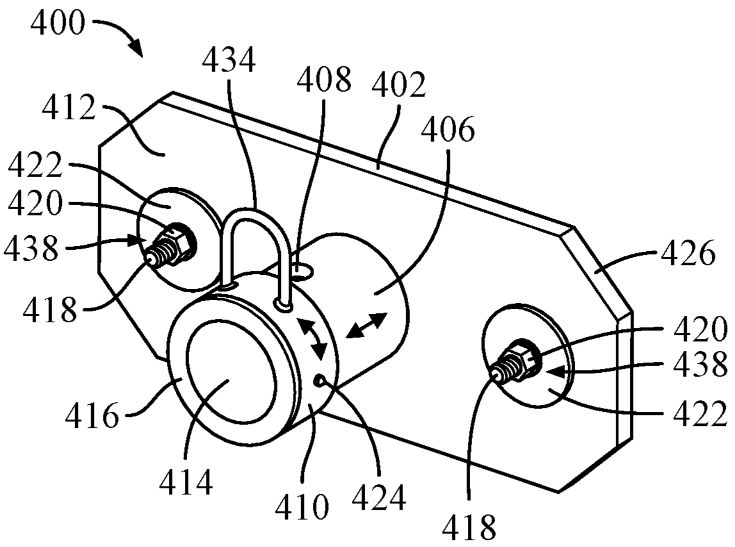
FIG. 4A shows a front perspective view of an attachment assembly used to attach the spool to the auger drive shaft of the digger truck.
Figure 4B:
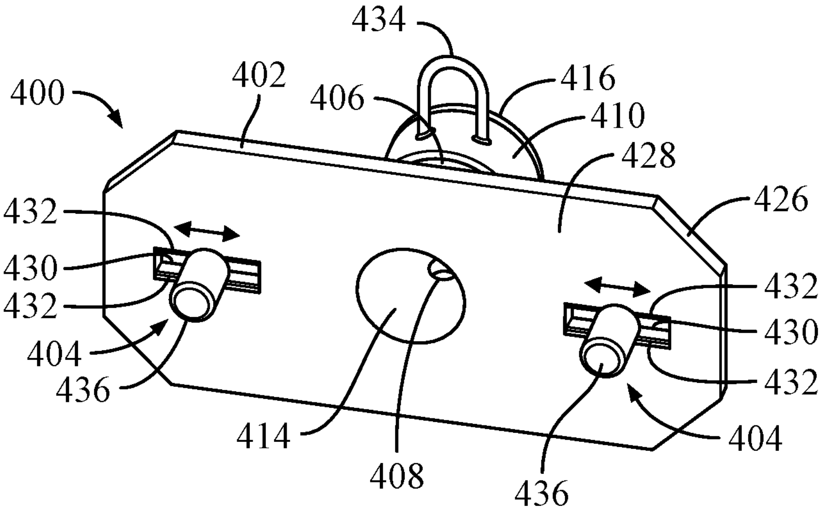
FIG. 4B shows a rear perspective view of an attachment assembly used to attach the spool to the auger drive shaft of the digger truck.
Figure 5A:
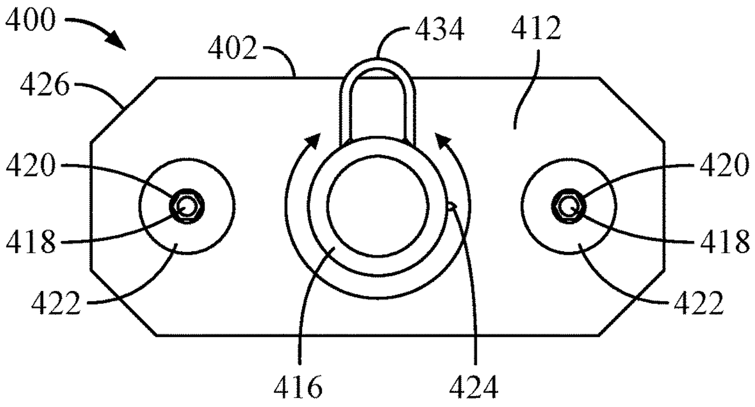
FIG. 5A shows a front view of the attachment assembly.
Figure 5B:
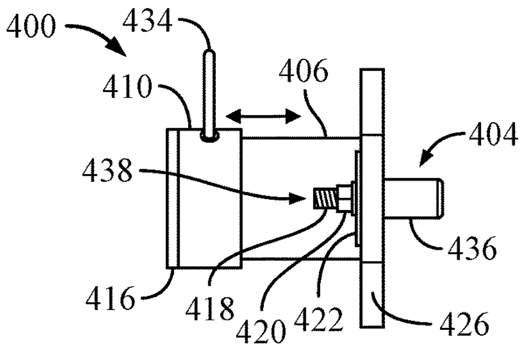
FIG. 5B shows a first side view of the attachment assembly.
Figure 5C:
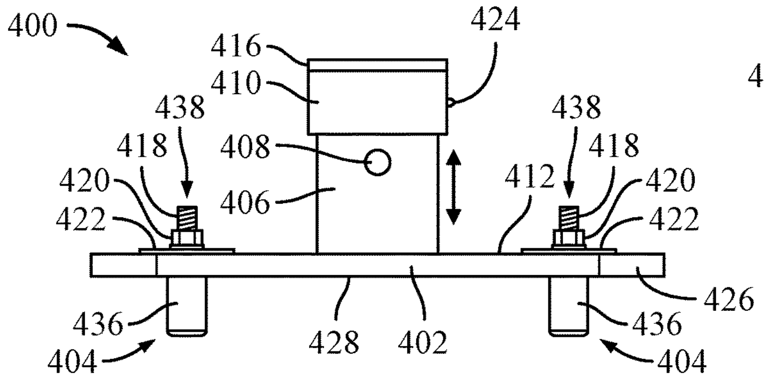
FIG. 5C shows a second side view of the attachment assembly.
Figure 5D:
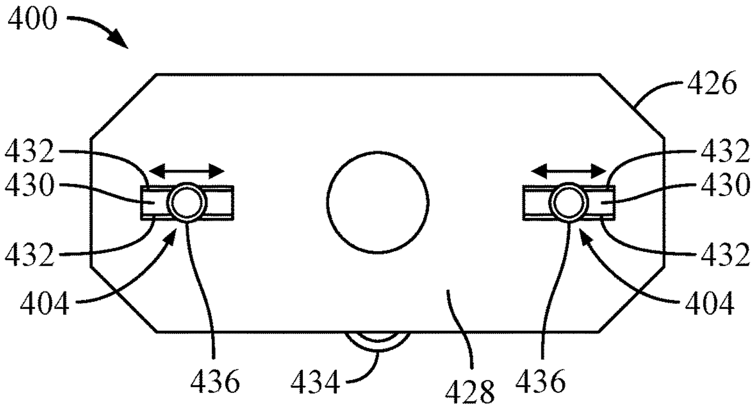
FIG. 5D shows a rear view of the attachment assembly.

Referring now to FIGS. 4A-B, front and rear perspective views of the attachment assembly 400 used to attach the spool 300 to the auger drive shaft 108 of the digger truck 100 (shown in FIG. 1B) is shown. The main components of the attachment assembly 400 may be the plate body 402 having a hollow cylinder 406, the studs 404, and the circular sleeve 410 around the hollow cylinder 406. The studs 404 and the circular sleeve 410 may all be adjustable on the plate body 402.

The plate body 402 of the attachment assembly 400 may be rectangular with tapered corner edges 426 and have a first plate surface 412 opposite to a second plate surface 428. The first plate surface 412 may have the hollow cylinder 406 attached and protruding outwards at the center of the first surface 412. By way of example and not limitation, the hollow cylinder 406 may be integrated with the plate body 402 and its first surface 412. As shown in FIG. 4B, the hollow interior of the hollow cylinder 406 may create a through hole 414 spanning from the tip of the hollow cylinder 416 through the other side of the plate body 402, at the second plate surface 428. The drive shaft 108 (shown in FIG. 2) may be inserted in the through hole 414 from the second plate surface 428 that is designed to contact and align with holes of the second flange disk 304*b* of the spool 300. The hollow cylinder 406 may have a second pinhole 408 designed to align with the first pinhole 202 of the drive shaft 108 for a pin to be inserted inside the pinholes and lock the two components together. The second pinhole 408 may penetrate from one side of the hollow cylinder to the other side, as shown in FIG. 4B. By way of example and not limitation, the tip of the hollow cylinder 416 may be defined by an outer rim structure that prevents the circular sleeve 410 from detaching from the hollow cylinder 406. By way of example and not limitation, the hollow cylinder 406 and the through hole 414 may be other shapes, such as cubical, to accommodate different types of drive shafts. By way of example and not limitation, the plate body 402 may also be other shapes, such as circular.

Figure 6A:
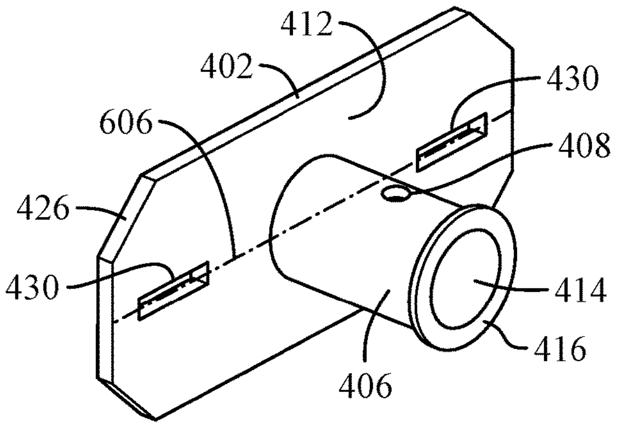
FIG. 6A shows a perspective view of a first main component of the attachment assembly.
Figure 6B:
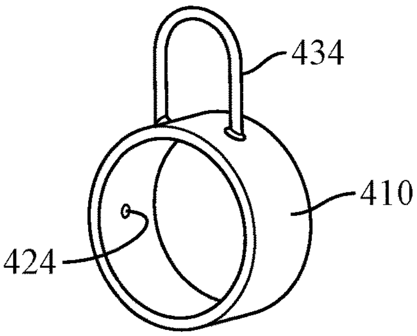
FIG. 6B shows a perspective view of a second main component of the attachment assembly.
Figure 6C:
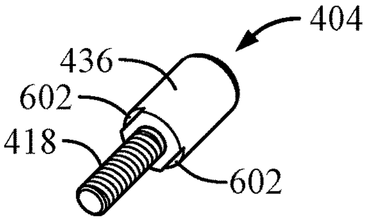
FIG. 6C shows a perspective view of a third main component of the attachment assembly.

With further reference to FIG. 6A, the plate body 402 may have a set of openings 430 penetrating through the plate body 402 near the sides of the hollow cylinder 406. By way of example and not limitation, the plate openings 430 may be rectangular. By way of example and not limitation, there may exist two openings 430 along the longitudinal span 604 of the plate body 402 and on each side of the hollow cylinder 406, where each opening 430 has a length along the longitudinal span 604 of the body plate 402. As shown in FIG. 4B, the studs 404 may be placed through each opening 430 and be adjusted along the length of the openings 430, as described elsewhere herein. The openings 430 may each have one or more grooves 432 on the second surface 428 that allows the studs 404 to fit within, slide, and be adjusted along the length of the openings 430. As shown in FIG. 6C, the coupling sides 436 of the adjustable studs 404 may have recessed edges 602 to help the studs 404 fit within, slide, and be adjusted along the grooves 432.

FIGS. 4A-B show the different sides of the adjustable studs 404 and their adjusting mechanism mechanisms 438. The adjusting mechanism 438 may allow the stud 404 to change its position along the length of the plate opening 430 to align with the coupling holes 308 of the spool 300, as shown in FIG. 2. With further reference to FIG. 6C, the adjustable stud 404 may have a coupling side 436 and an adjusting side 418. By way of example and not limitation, the coupling side 436 may be cylindrical and designed to fit and interlock with the coupling holes 308 of the spool 300, as shown in FIG. 2. By way of example and not limitation, the coupling side 436 may also have a locking mechanism to achieve the interlocking with the coupling holes 308. The cylindrical end of the coupling side 436 nearest to the adjusting side 418 may have recessed edges 602 to help the stud 404 fit within, slide, and be adjusted along the grooves 432 of the plate body 402 located on the second plate surface 428, as shown in FIG. 4B.

By way of example and not limitation, the adjusting side 418 of the stud 404 may be inserted from the second plate surface 428 inside the opening 430, where the recessed edges 602 fit within the grooves 432. The adjusting side 418 may extend through the plate body 402, where a portion of the adjusting side 418 may stick out of the first plate surface 412. The adjusting side 418 may slide within the longitudinal length of the plate opening 430 to align the coupling side 436 of the stud 404 with the side holes 308 of the spool 300, as shown in FIG. 2. After the coupling side 436 of the stud 404 is aligned with the side holes 308 of the spool 300, the stud 404 may be fixed in place at a position on the opening 430 using the adjusting side 418. By way of example and not limitation, the adjusting side 418 of the stud 404 may be threaded and bolt shaped in order for a nut 420 and a lock washer 422 to fasten the adjusting side 418 in a fixed place along the length of the opening 430. As a result, the adjusting side 418 of the stud 404, the nut 420, and the lock washer 422 may be the adjusting mechanism 438 of the stud 404. Other adjusting mechanisms 438 are also contemplated. Alternatively, the studs 404 may be fixed in one place and be integrated with the plate 402.

As shown in FIG. 4A, a rotatable circular sleeve 410 having a tying ring 434 may be wrapped around the hollow cylinder 406 and cover a portion of the length of the hollow cylinder 406. The circular sleeve 410 may be used to create the supporting mechanism 120 for the spooling mechanism 101 shown in FIG. 1B. An end of a strap, rope, or a chain may be used to loop inside and tie with the tying ring 434, where the other end may be tightened to a component of the digger truck 100 (shown in FIG. 1B), preferably a component on the same level as the circular sleeve 410 when the attachment assembly 400 and the spooling mechanism 101 are positioned for operation. The tying ring 434 may also be considered as a connection ring 434. By way of example and not limitation, the length of the strap, rope, or chain may be adjusted when tightened to create the necessary tensile force to keep the attachment assembly 400 and the spooling mechanism 101 in the desired position and orientation when winding or unwinding wire onto the spool 300. The adjustment of the strap, rope, or chain may be in the form of shortening or widening the length to create the necessary tensile force. The function of the supporting mechanism 120 created by the circular sleeve 410 is described elsewhere herein.

The circular sleeve 410 allows the hollow cylinder 406 and the attachment assembly 400 to freely rotate about the axis of rotation 204 (shown in FIG. 2) while the tensile force of the supporting mechanism 120 is active for keeping the spooling mechanism 101 in a relatively fixed translational position relative to the digger truck 100 (shown in FIG. 1B). This is because the circular sleeve 410 may rotate freely around the hollow cylinder 406. As shown in FIG. 4A, the circular sleeve 410 may have a grease fitting 424 to provide an entry way for lubrication to be applied to the outer surface of the hollow cylinder 406 and the inner surface of the circular sleeve 410. Such application of lubrication may reduce the frictional force between the two surfaces when the attachment assembly 400 rotates to provide winding or unwinding force to the spool 300.

The circular sleeve 410 may also be adjustable along the length of the hollow cylinder 406. By way of example and not limitation, when the attachment assembly 400 is positioned for operation in the spooling mechanism 101, as shown in FIG. 1B, the circular sleeve 410 may naturally slide down towards the tip of the hollow cylinder 416. This is because the first plate surface 412 of the attachment assembly 400 would be facing the ground and gravity would be acting upon the sleeve 410. As a result, the tip of the hollow cylinder 416 may have an outer rim that is thicker than the rest of the hollow cylinder 406 to prevent the circular sleeve 410 from detaching. Additionally, the circular sleeve 410 would need to clear the cylinder pinhole 408 when sliding downwards towards the tip of the hollow cylinder 416 in order for a pin to be inserted in such pinhole. When the pin for locking the attachment assembly 400 to the drive shaft 108 (shown in FIG. 2) is inserted through the second pinhole 408, the pin may act as a barrier that prevents the circular sleeve 410 from moving up and down the length of the hollow cylinder 406. As a result, the circular sleeve 410 may be fixed along the length of the cylinder. The circular sleeve 408 may also be configured that when translated towards the tip of the hollow cylinder 416, the tying ring 434 would not contact the adjusting side 418 of the adjustable studs 404 when the attachment assembly 400 is in motion. Alternatively, the circular sleeve 410 may be designed to be in a fixed translational position instead of being adjustable but may be able to freely rotate around the hollow cylinder 406.

Referring now to FIGS. 5A-D, the front, first side, second side, and rear views of the attachment assembly 400 is shown, respectively. From these views, the different parts of the attachment assembly may be appreciated from different perspectives. Referring now to FIGS. 6A-C, the main components of the attachment assembly 400 isolated from each other is shown. FIGS. 6A-C allow the different components of the plate body 402, circular sleeve 410, and the adjustable studs 404 to be clearly shown.

Figure 7:
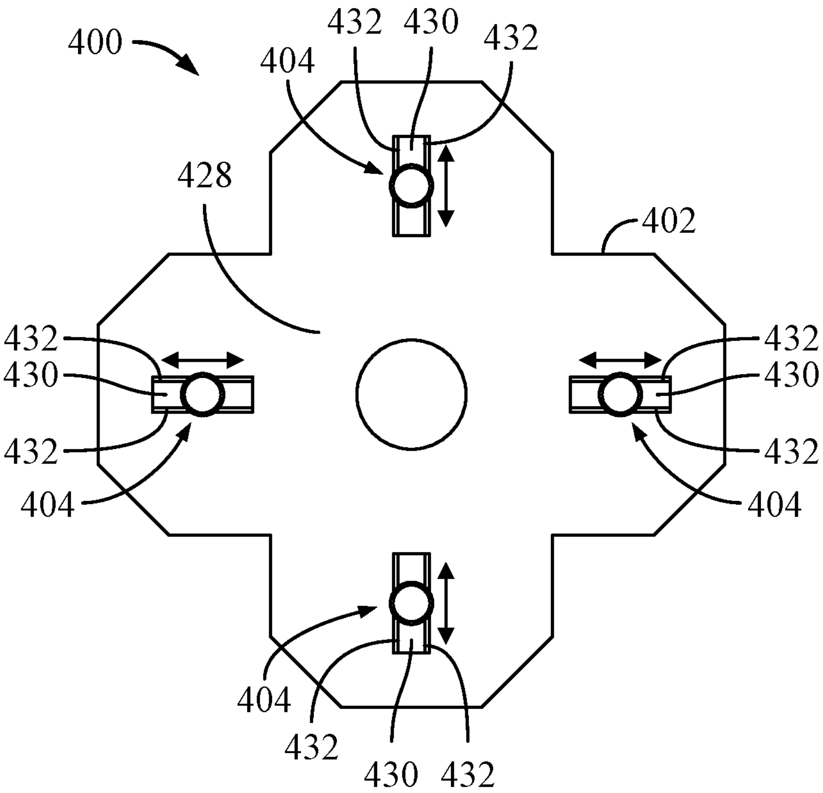
FIG. 7 show an alternate embodiment of the attachment assembly.

Referring now to FIG. 7, a bottom view of an alternate embodiment of the attachment assembly 400 is shown. Such alternate embodiment may have a cross-shaped plate body 402, where each side of the cross has a stud 404, which the studs 404 may preferably be adjustable but may also be fixed. Having the additional studs 404 may allow the attachment assembly 400 to couple to additional side holes 308 of the spool 300 (shown in FIG. 2), which may create a more secured attachment between the components. The orientation of the sides of the cross-shaped plate body 402 may also change relative to each other to align with the side holes 308 in different orientations. The other components and features of this alternate embodiment may be the same as the original embodiment described elsewhere herein.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method for converting and using an auger digging mechanism of a digger vehicle into a spooling mechanism to wind or unwind wire, comprising:

coupling an attachment assembly to a wire spool using a first stud and a second stud that extend outwards from a first surface of the attachment assembly to a first coupling hole and a second coupling hole of a first flange disk of the wire spool;

inserting a drive shaft of the auger digging mechanism through a center hole of the wire spool from a second flange disk through a body of the wire spool and out of the first flange disk, the drive shaft also being inserted inside a hollow cylinder protruding outwards from a second surface of the attachment assembly;

securing the drive shaft to the attachment assembly by aligning a transverse hole of the hollow cylinder with a pin hole of the drive shaft and inserting a pin through the pin hole and the transverse hole;

tying a supporting mechanism to a sleeve rotatably disposed around the hollow cylinder to maintain a desired orientation of the wire spool; and operating the auger digging mechanism to provide a rotational force to the drive shaft that rotates the attachment assembly and the wire spool to provide a reeling force to wind or unwind wire onto the body of the wire spool.

2. The method of claim 1, further comprising guiding wire onto the body of the wire spool using a wire guiding mechanism that is attached to a winch line of the digger vehicle.

3. The method of claim 2, further comprising moving the winch line upwards and downwards for the wire guiding mechanism to guide wire evenly onto the body of the wire spool.

4. The method of claim 1, further comprising adjusting the first and the second studs along a length of the attachment assembly prior to being coupled to the first and the second coupling holes.

5. The method of claim 1, further comprising activating a plurality of stabilizers of the digger vehicle prior to operating the auger digging mechanism to provide the rotational force.

* * * * *